(12) United States Patent
Eberling-Fux et al.

(10) Patent No.: US 8,846,147 B2
(45) Date of Patent: Sep. 30, 2014

(54) METHOD FOR MANUFACTURING A COMPLEXLY SHAPED COMPOSITE MATERIAL PART

(75) Inventors: Nicolas Eberling-Fux, Talence (FR); Eric Bouillon, Le Haillan (FR); Clément Roussille, Bordeaux (FR); Stéphane Otin, Paris (FR); Dominique Coupe, Le Haillan (FR)

(73) Assignees: Herakles, Le Haillan (FR); Snecma, Paris (FR)

( * ) Notice: Subject to any disclaimer, the term of this patent is extended or adjusted under 35 U.S.C. 154(b) by 438 days.

(21) Appl. No.: 13/131,320

(22) PCT Filed: Nov. 26, 2009

(86) PCT No.: PCT/FR2009/052308
§ 371 (c)(1),
(2), (4) Date: Aug. 3, 2011

(87) PCT Pub. No.: WO2010/061139
PCT Pub. Date: Jun. 3, 2010

(65) Prior Publication Data
US 2011/0293828 A1    Dec. 1, 2011

(30) Foreign Application Priority Data

Nov. 28, 2008    (FR) ..................................... 08 58098

(51) Int. Cl.
*C23C 16/00*    (2006.01)
*C04B 35/565*    (2006.01)
(Continued)

(52) U.S. Cl.
CPC ............... *B29B 11/16* (2013.01); *C04B 35/565* (2013.01); *C04B 2235/614* (2013.01); *F01D 17/20* (2013.01); *C04B 35/83* (2013.01); *C04B 35/62868* (2013.01); *C04B 2235/94* (2013.01); *C04B 2235/5252* (2013.01); *Y02T 50/672* (2013.01); *C04B 35/806* (2013.01);
(Continued)

(58) Field of Classification Search
USPC .......... 427/249.2, 255.12, 289, 290, 292, 900
See application file for complete search history.

(56) References Cited

U.S. PATENT DOCUMENTS

| 5,071,679 A | 12/1991 | Heraud et al. |
| 5,246,736 A | 9/1993 | Goujard et al. |

(Continued)

FOREIGN PATENT DOCUMENTS

| FR | 2640258 | 6/1990 |
| FR | 2582004 | 9/2004 |

(Continued)

OTHER PUBLICATIONS

International Search Report as issued for PCT/FR2009/052308.

*Primary Examiner* — Kelly M Gambetta
(74) *Attorney, Agent, or Firm* — Pillsbury Winthrop Shaw Pittman, LLP

(57) ABSTRACT

A method of fabricating a complex part out of composite material including three-dimensional woven fiber reinforcement densified by a matrix, the method including three-dimensionally weaving a continuous fiber strip including a succession of fiber blanks for preforms of a plurality of parts that are to be fabricated; subsequently cutting individual fiber blanks out from the strip, each blank being a one-piece blank; shaping a cut-out blank to obtain a one-piece fiber preform having a shape that is close to the shape of a part that is to be fabricated; consolidating the preform in the desired shape; and densifying the consolidated preform by forming a matrix by chemical vapor infiltration.

19 Claims, 11 Drawing Sheets

(51) Int. Cl.
  *F01D 17/20* (2006.01)
  *C04B 35/83* (2006.01)
  *C04B 35/628* (2006.01)
  *C04B 35/80* (2006.01)
  *F01D 5/28* (2006.01)
  *B29B 11/16* (2006.01)
  *C04B 35/52* (2006.01)
  *B05D 3/12* (2006.01)
  *B29B 11/02* (2006.01)

(52) U.S. Cl.
  CPC ..... *C04B 35/62873* (2013.01); *C04B 35/62897* (2013.01); *C04B 35/6286* (2013.01); *C04B 2235/5244* (2013.01); *F01D 5/282* (2013.01); *F05D 2300/601* (2013.01); *F05D 2300/6012* (2013.01); *F05D 2300/614* (2013.01); *B29B 11/02* (2013.01); *C04B 35/52* (2013.01); *Y10S 427/10* (2013.01)
  USPC ............... 427/249.2; 427/255.12; 427/289; 427/290; 427/292; 427/900

(56) References Cited

U.S. PATENT DOCUMENTS

| | | | | |
|---|---|---|---|---|
| 5,350,545 A | * | 9/1994 | Streckert et al. | 156/89.27 |
| 5,965,266 A | | 10/1999 | Goujard et al. | |
| 7,101,154 B2 | * | 9/2006 | Dambrine et al. | 416/230 |
| 2008/0299385 A1 | * | 12/2008 | Philippe et al. | 428/336 |
| 2009/0311462 A1 | * | 12/2009 | Goering | 428/99 |

FOREIGN PATENT DOCUMENTS

| | | |
|---|---|---|
| FR | 2882356 A1 * | 8/2006 |
| FR | 2 933 970 | 1/2010 |
| GB | 830 436 | 3/1960 |
| JP | 2003-148105 | 5/2003 |
| WO | WO 97/33829 | 9/1997 |
| WO | WO 9733829 A1 * | 9/1997 |
| WO | WO 2006/136755 | 12/2006 |

\* cited by examiner

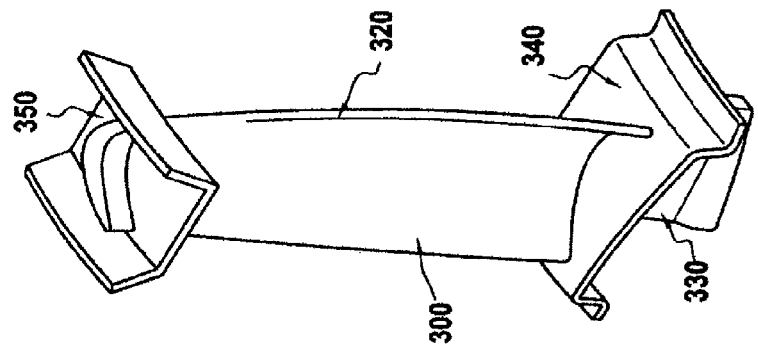
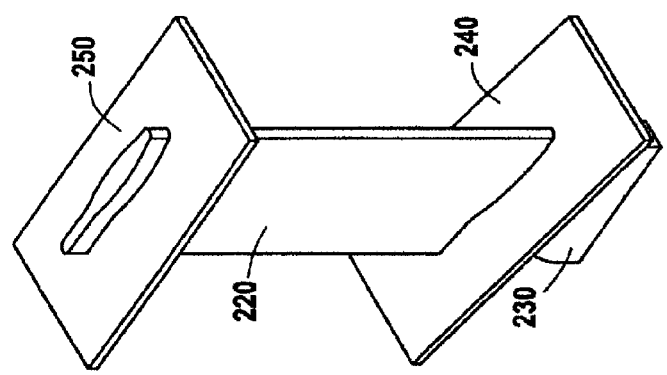
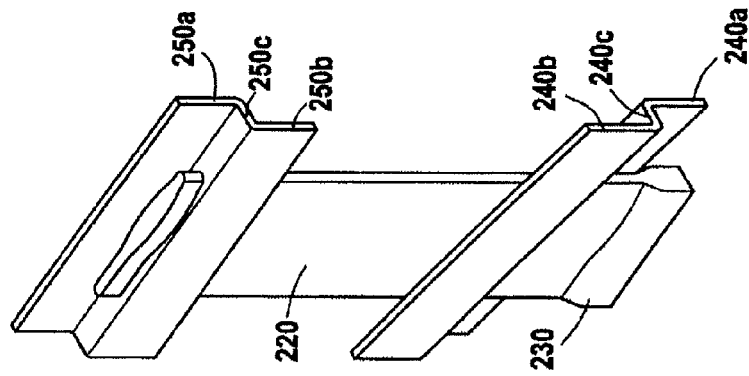
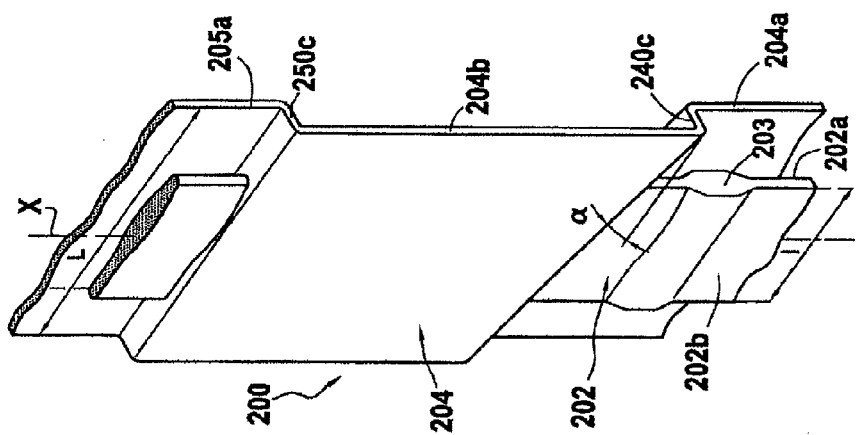
FIG.7
FIG.6
FIG.5
FIG.4

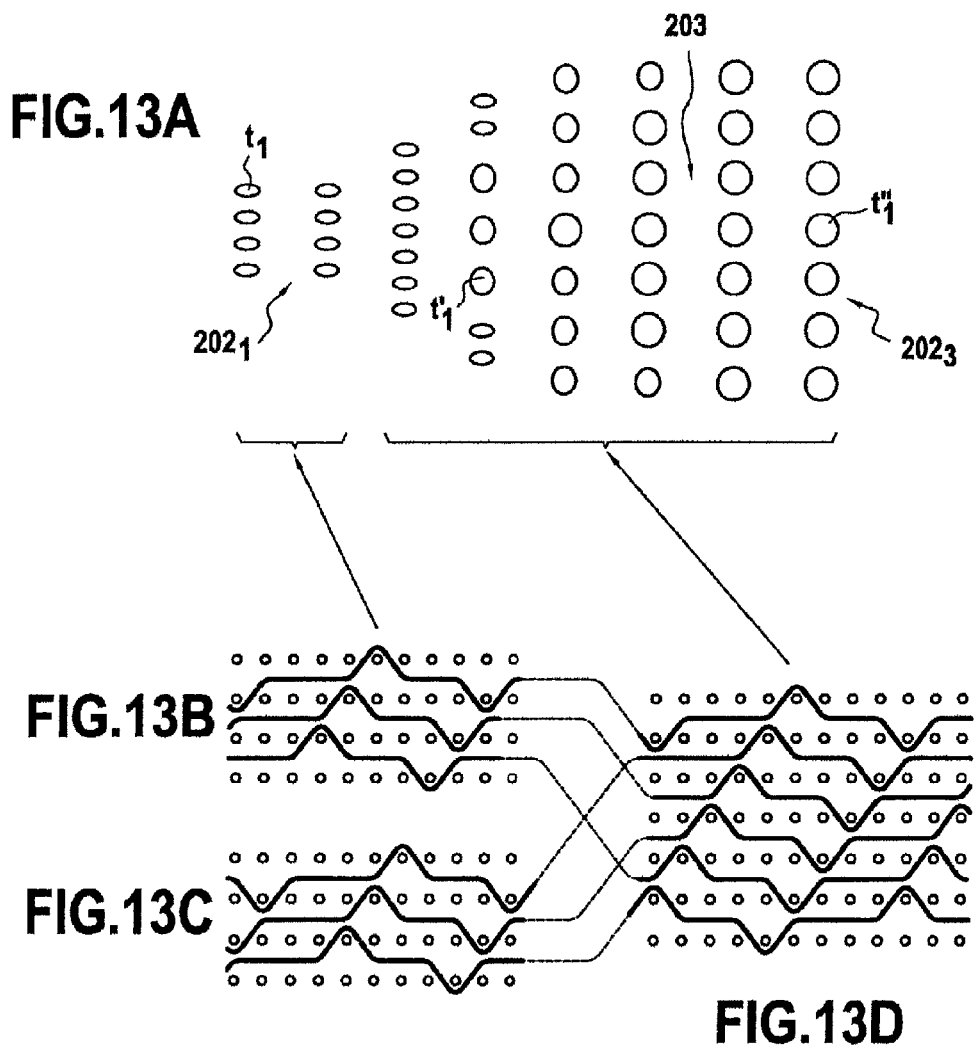
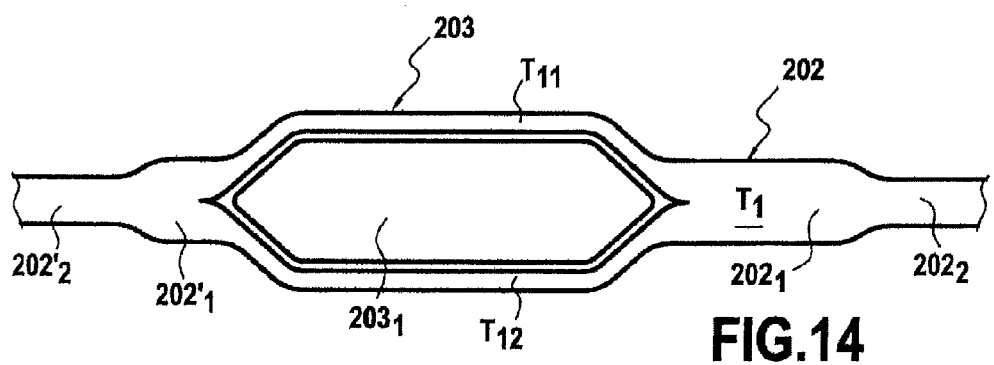

METHOD FOR MANUFACTURING A COMPLEXLY SHAPED COMPOSITE MATERIAL PART

CROSS REFERENCE TO RELATED APPLICATIONS

This application is the U.S. National Stage of PCT/FR2009/052308 filed Nov. 26, 2009, which in turn claims priority to French Application No. 0858098, filed Nov. 28, 2008. The contents of both applications are incorporated herein by reference in their entirety.

BACKGROUND OF THE INVENTION

The invention relates to fabricating parts of complex shape out of composite material.

An example of an application of the invention is fabricating parts out of thermostructural composite material for use in the fields of aviation and space.

In well-known manner, fabricating a part out of thermostructural composite material comprises making a fiber preform out of refractory fibers (carbon fibers or ceramic fibers), the preform having a shape that is close to the shape of the part that is to be fabricated, and then densifying the fiber preform with a refractory matrix (of carbon or ceramic).

In order to make the fiber preform, various textile techniques can be used. One known technique consists in making a preform by three-dimensional weaving, or multilayer weaving. Such a method of weaving enables interlacing to be established between layers of yarns so as to give the preform the strength needed to obtain a composite material part having high-grade mechanical properties.

With parts that are complex in shape, it can be difficult or even impossible to make a fiber preform directly by three-dimensional (3D) weaving.

It is then possible to make the fiber preform as a plurality of separate parts that are assembled together, e.g. by stitching or by implanting yarns, prior to densifying the preform. However the connections between the various portions of the preform may constitute points of weakness.

It is also known to make a fiber blank by 3D weaving with the fiber preform being obtained from the blank by shaping the blank. The shaping of the blank may comprise unfolding or folding over one or more portions of the blank that are adjacent to de-bonding zones that are formed during weaving or that are adjacent to cuts or incisions that are made in the blank.

The fiber preform is held in the desired shape by consolidation using a liquid technique or a gaseous technique. Liquid consolidation comprises impregnating the preform with a consolidation composition containing a resin and applying heat treatment to cure and pyrolyze the resin. The quantity of resin is selected so that the pyrolysis residue achieves sufficient densification to enable the preform to conserve its shape without the assistance of support tooling. Gas consolidation comprises partially densifying the preform by depositing a material on the fibers by chemical vapor infiltration (CVI), the quantity of material that is deposited being selected to be sufficient to connect together the fibers of the preform so that it conserves its shape without the assistance of support tooling. The consolidated preform is subsequently densified with a refractory matrix.

Document U.S. Pat. No. 5,350,545 describes a method of making ceramic matrix composite (CMC) parts of complex shape by using a ceramic-precursor resin to consolidate a fiber preform made of a woven or braided material, followed by densifying the consolidated preform by chemical vapor infiltration.

In addition, particularly but not exclusively for CMC materials, the formation of an interphase on the fibers serves, when using liquid consolidation, to avoid the residue of pyrolyzing the resin adhering excessively strongly on the fibers, and also serves, when using gas consolidation, to greatly reduce sensitivity to cracking and to increase ability to withstand impacts.

Furthermore, it may be desirable, particularly when the fibers used are commercially available ceramic fibers, to perform treatment on the fibers prior to forming an interphase and consolidation, for the purpose of eliminating a sizing or an oxide film present on the surfaces of the fibers.

Those various operations require a great deal of manipulation, thereby increasing the complexity and the cost of fabricating parts.

Document WO 97/33829 discloses a method of fabricating valves out of carbon/carbon composite material, the method including making a braided preform. A continuous braid may be made with carbon inserts being put into place at regular intervals inside the braid in order to obtain valve preforms by cutting out segments from the braid containing the inserts.

OBJECT AND SUMMARY OF THE INVENTION

The present invention seeks to propose a method suitable for rationalizing the fabrication of parts of complex shapes out of composite material comprising fiber reinforcement densified by a matrix, and in which the fiber reinforcement is 3D-woven-reinforcement.

According to the invention, this object is achieved by a method comprising the steps of:
- three-dimensionally weaving a continuous fiber strip comprising a succession of fiber blanks for preforms of a plurality of parts that are to be fabricated;
- subsequently cutting individual fiber blanks out from the strip, each blank being a one-piece blank;
- shaping a cut-out blank to obtain a one-piece fiber preform having a shape that is close to the shape of a part that is to be fabricated;
- consolidating the preform in the desired shape; and
- densifying the consolidated preform by forming a matrix by chemical vapor infiltration.

Advantageously, surface treatment is performed on the fibers of the woven fiber strip, which treatment comprises at least one of the following operations: removing sizing from the fibers and acid treatment of the fibers.

In a first implementation, prior to cutting out the individual fiber blanks, the woven fiber strip is impregnated by a consolidation liquid composition comprising a resin, and consolidation is performed by curing and pyrolyzing the resin.

Advantageously, prior to impregnating with the consolidation composition, a fiber-matrix interphase layer is formed on the fibers of the woven fiber strip, the interphase layer being made of a material selected from pyrolytic carbon (PyC), boron nitride (BN), and boron-doped carbon (BC). The interphase layer preferably presents thickness of no more than 100 nanometers (nm) in order to preserve the deformation capacity of the fiber blank.

After impregnation with the consolidation composition and before cutting out the blanks, it is possible to perform pre-curing of the consolidation resin. Such pre-curing or partial curing may provide stiffness and thus additional strength of the fiber blank.

When a thin fiber-matrix interphase layer has been formed prior to impregnating the strip, an additional interphase layer may be formed after the consolidated preform has been obtained and before it is densified with the matrix.

Under such circumstances, and advantageously, the additional interphase layer is made by chemical vapor infiltration, and the forming of the additional interphase layer and the densification are performed one after the other in an oven.

The fiber blank may be shaped in a mold in which curing and pyrolysis of the consolidation resin are performed one after the other.

In a variant, the resin is pyrolyzed during a temperature rise that is performed in preparation for an operation of chemical vapor infiltration.

In another implementation of the method, the consolidation is performed by partial densification of the preform by chemical vapor infiltration while the preform is held in the desired shape.

Advantageously, in this other implementation, prior to consolidation and after shaping, a fiber-matrix interphase coating is formed on the fibers of the preform, the interphase coating being made of a material selected from pyrolytic carbon (PyC), boron nitride (BN), and boron-doped carbon (BC). The interphase coating presents a thickness lying in the range one hundred to a few hundreds of nanometers, approximately.

According to a feature of the method, the densification comprises two steps separated by an operation of machining the partially densified preform.

According to another feature of the method, prior to densification by chemical vapor infiltration, pre-machining is performed on the consolidated preform.

The woven strip may comprise a plurality of rows of fiber blanks, which rows extend in the longitudinal direction of the strip.

Advantageously, the strip is woven with zones of extra length in the warp and weft directions all around the fiber blanks.

Thus, the method of the invention is remarkable in that the operations that precede shaping a fiber blank are performed on a continuous 3D woven strip that is easy to handle and that enables a plurality of blanks to be treated simultaneously. This provides a significant advantage in terms of fabricating a large number of similar parts.

The method of the invention is particularly, but not exclusively suitable for making parts of complex shapes out of ceramic matrix composite material.

A particular application is fabricating turbomachine blades. The strip is then advantageously woven as a succession of fiber blanks that are suitable, after being shaped, for constituting fiber preforms, each constituting a one-piece preform for at least an airfoil and a root of a blade, the fiber blanks being woven with their longitudinal direction, which corresponds to the longitudinal direction of the blades that are to be fabricated, extending in the weft direction or in the warp direction.

BRIEF DESCRIPTION OF THE DRAWINGS

The invention can be better understood on reading the following description made by way of non-limiting indication with reference to the accompanying drawings, in which:

FIG. 4 is a highly diagrammatic illustration of the arrangement of two sets of layers of yarns in a three-dimensional woven fiber blank for making a fiber preform for a blade of the kind shown in FIG. 3;

FIGS. 5, 6, and 7 show successive steps in making a fiber preform for a blade as shown in FIG. 1, starting from the fiber blank of FIG. 3;

FIG. 13A is a weft section view showing an example of the arrangement of the weft yarns in a portion of the fiber blank corresponding to a portion of the blade root;

FIGS. 13B, 13C, and 13D are weft section views showing warp planes for one example of (multilayer) three-dimensional weaving in the FIG. 10A portion of the fiber blank;

FIG. 14 is a fragmentary diagrammatic view in section showing another way of making a portion corresponding to a blade root;

DETAILED DESCRIPTION OF IMPLEMENTATIONS

Figure 1:
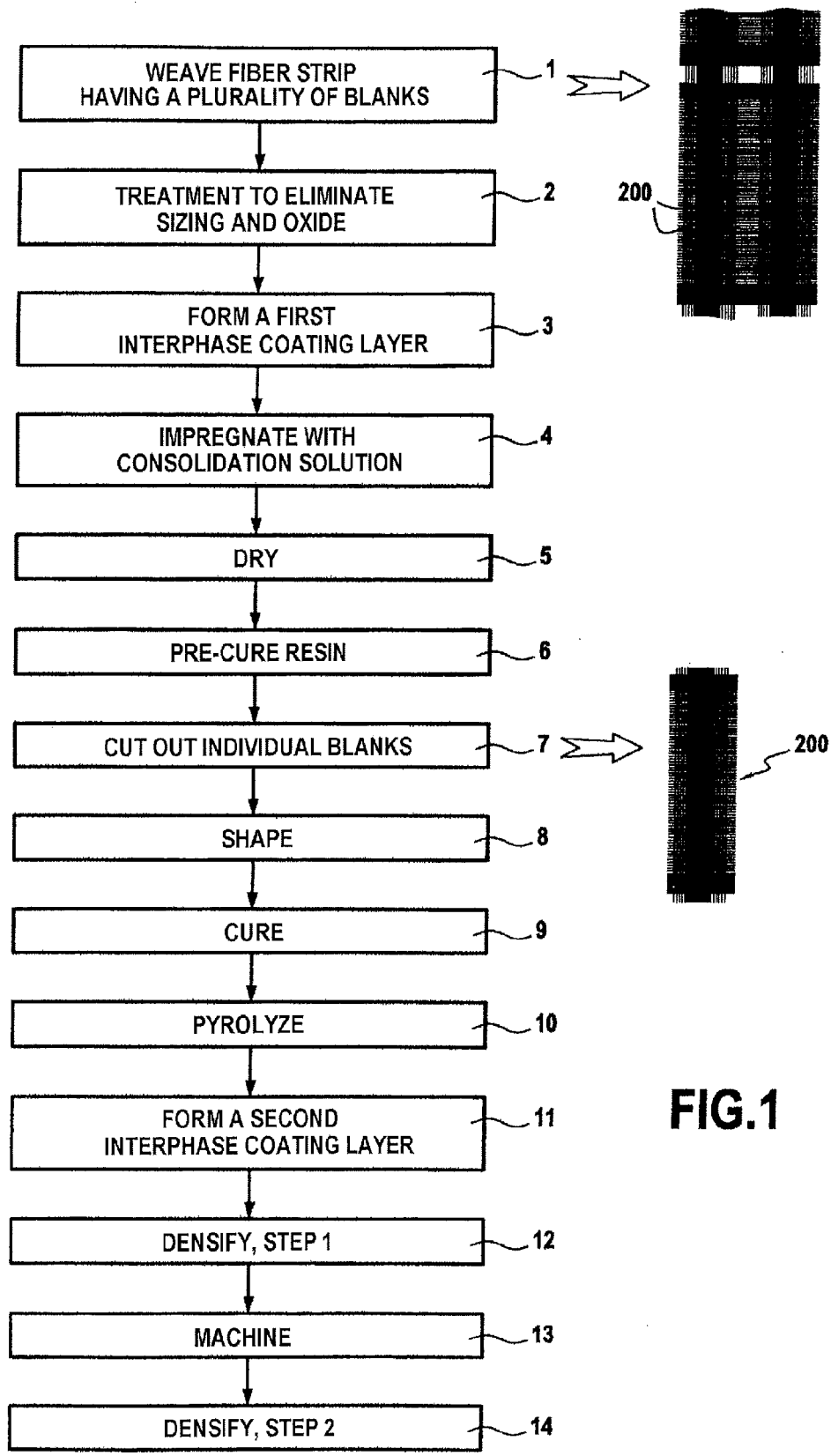
FIG. 1 shows the successive steps of a first implementation of the method of the invention.

Successive steps of a method of fabricating a composite material part in a first implementation of the method of the invention are given in FIG. 1.

In this example, consideration is given to making a ceramic matrix composite (CMC) material part comprising fiber reinforcement of ceramic fibers densified with a ceramic matrix.

In step 1, a fiber strip is woven by 3D weaving and comprises at least one row of fiber blanks 200. The fiber blanks may have longitudinal directions oriented in the warp direction, i.e. in the longitudinal direction of the strip, as shown, or in a variant they may be oriented in the weft direction. Techniques for making fiber blanks for fabricating various parts are described in detail below. By way of example, the ceramic fibers are SiC fibers, weaving then being performed using SiC fiber yarns, such as for example those sold under the name "Nicalon" by the Japanese supplier Nippon Carbon.

In step 2, the fiber strip is treated to eliminate the sizing present on the fibers and the presence of oxide on the surfaces of the fibers. Oxide elimination is obtained by acid treatment, in particular by immersion in a bath of hydrofluoric acid. Prior treatment for eliminating sizing is performed, e.g. by decomposing the lubricant with short heat treatment.

In step 3, a thin layer of interphase coating is formed on the fibers of the fiber strip by chemical vapor infiltration (CVI). The interphase coating material is constituted, for example, by pyrolytic carbon (PyC), by boron nitride (BN), or by boron doped carbon (BC, e.g. with 5 atomic percent (at %) to 20 at % of B, the balance being C). The thin layer of the interphase coating is preferably of small thickness, e.g. no more than 100 nm, or indeed no more than 50 nm, so as to conserve good capacity in the fiber blanks for deforming. The thickness is preferably not less than 10 nm.

In step 4, the fiber strip with the fibers coated in a thin layer of interphase coating is impregnated with a consolidation composition, typically a resin, possibly diluted in a solvent. It is possible to use a carbon-precursor resin, e.g. a phenolic or a furanic resin, or a ceramic-precursor resin, e.g. a polysilazane, polysiloxane, or polycarbosilane resin as precursors of SiCN, SiCO, and SiC.

After drying by eliminating any solvent of the resin (step 5), it is possible to perform pre-curing of the resin (step 6). Pre-curing or incomplete curing serves to increase stiffness, and thus strength, while leaving the capacity for deformation that is needed to make preforms by shaping the blanks.

In step 7, the individual fiber blanks 200 are cut out.

In step 8, a fiber blank as cut out in this way is shaped and placed in a mold or shaper, e.g. made of graphite for shaping so as to obtain a preform with a complex shape that is close to that of a composite material part that is to be fabricated.

Thereafter, curing of the resin is completed (step 9) and the cured resin is pyrolyzed (Step 10). Curing and pyrolysis may follow on one from the other by progressively raising the temperature in the mold.

After pyrolysis, a fiber preform is obtained that is consolidated by the pyrolysis residue. The quantity of consolidation resin is selected so that the pyrolysis resin binds the fibers of the preform together sufficiently to enable it to be handled while conserving its shape without assistance from tooling, it being observed that the quantity of consolidation resin is preferably selected to be as small as possible.

Steps of eliminating sizing, performing acid treatment, and forming an interphase coating on a substrate of SiC fibers are known. Reference may be made to document U.S. Pat. No. 5,071,679.

A second interphase layer may be formed by CVI (step 11) if necessary in order to obtain an overall fiber-matrix interphase of thickness that is sufficient to perform a function of causing the composite material to be less brittle. The second interphase layer may be a material selected from PyC, BN, and BC, and need not necessarily be the same as the material constituting the first interphase layer. As is known, such interphase materials are capable of relieving stresses at the bottoms of cracks that reach the interphase through the matrix of the composite material, and then avoiding or slowing down the propagation of cracks through the fibers which leads to rupture of the fibers, thus making the composite material less brittle. The thickness of the second interphase layer is preferably not less than 100 nm.

Making an interphase as two layers, as described above, is preferred. It is described in the French patent application filed under the No. 08/54937 by one of the Applicants. The first interphase layer contributes to avoid the residue of pyrolyzing the consolidation resin adhering excessively on the fibers.

The consolidated preform is then densified with a ceramic matrix. This densification may be performed by CVI, and under such circumstances the second interphase layer and the densification with the ceramic matrix may follow on one from the other in the same oven.

CVI densification of a preform with a ceramic matrix, in particular an SiC matrix, is well known. A reaction gas containing methyltrichlorosilane (MTS) and gaseous hydrogen ($H_2$) may be used. The consolidated preform is placed in an enclosure, without using tooling to keep it in shape, and the gas is introduced into the enclosure. Under controlled conditions in particular of temperature and pressure, the gas diffuses into the pores of the preform so as to form the deposit of SiC matrix by reaction between its constituents.

Naturally, depending on the nature of the desired composite material, the method may be implemented using a fiber strip of fibers that are other than ceramic, e.g. carbon fibers. The acid treatment of step 10 for eliminating the oxide layer is then omitted.

Similarly, CVI densification of the consolidated preform may be performed using a matrix other than SiC, in particular a carbon matrix or a self-healing matrix, with examples of self-healing matrix phases being a ternary Si—B—C system or boron carbide $B_4C$. Reference may be made to documents U.S. Pat. No. 5,246,736 and U.S. Pat. No. 5,965,266 which describe using CVI to obtain such self-healing matrices.

Densification may be performed in two successive steps (steps 12 and 14) separated by a step 13 of machining the part that is to be fabricated to the desired dimensions. The second densification step serves not only to finish off densifying the composite material to the core, but also to form a surface coating on any fibers that might have been laid bare during the machining.

It should be observed that pre-machining or trimming may be performed between steps 9 and 10, i.e. after curing and prior to pyrolyzing the resin.

Successive steps of a method of fabricating a composite material part in a second implementation of the method of the invention are described with reference to FIG. 2.

Step 21 of three-dimensionally weaving a fiber strip made up of a plurality of fiber blanks 200, and step 22 of applying treatment to eliminate sizing and oxide are similar to steps 1 and 2 of the implementation of FIG. 1.

In step 23, individual fiber blanks are cut out from the fiber strip, and then each individual fiber blank is shaped in a mold or shaper (step 24) in order to obtain a fiber preform having the desired complex shape.

In step 25, an interphase coating for relieving embrittlement is formed by CVI on the fibers of the fiber strip. By way of example; the interphase coating material is PyC, BN, or BC, as mentioned above. The thickness of the interphase coating is in the range one hundred to a few hundreds of nanometers, approximately.

With the preform being held in shape in the shaper, the preform is consolidated by partial densification (step 26), the consolidation being performed by forming a ceramic deposit on the fibers by CVI.

The forming of the interphase coating by CVI and the consolidation by ceramic deposition by CVI may follow on one from the other in the same CVI oven.

The shaper is preferably made of graphite and presents holes to facilitate passage of the reaction gas that gives rise to deposition of interphase and to deposition of ceramic by CVI.

Once consolidation is sufficient to enable the preform to be handled while conserving its shape without requiring assistance from support tooling, the consolidated preform is extracted from the shaper and densification with a ceramic matrix is performed by CVI. The densification may be performed in two successive steps (steps 27 and 29) separated by a step 28 of machining the part for fabrication to the desired dimensions.

Above, the interphase coating is formed during step 23 on the fibers of the fiber strip, prior to cutting out the blanks 200. In a variant, the interphase coating may be formed after the preform has been shaped (step 25) and before it is consolidated (step 26). The formation of the interphase coating by CVI and the consolidation by ceramic deposition by CVI may then follow on one from the other in the same CVI oven. By proceeding in this way, it is possible to form an interphase coating of thickness that is not limited in order to leave some capacity for deformation in order to form the preform.

Example 1

Figure 3:
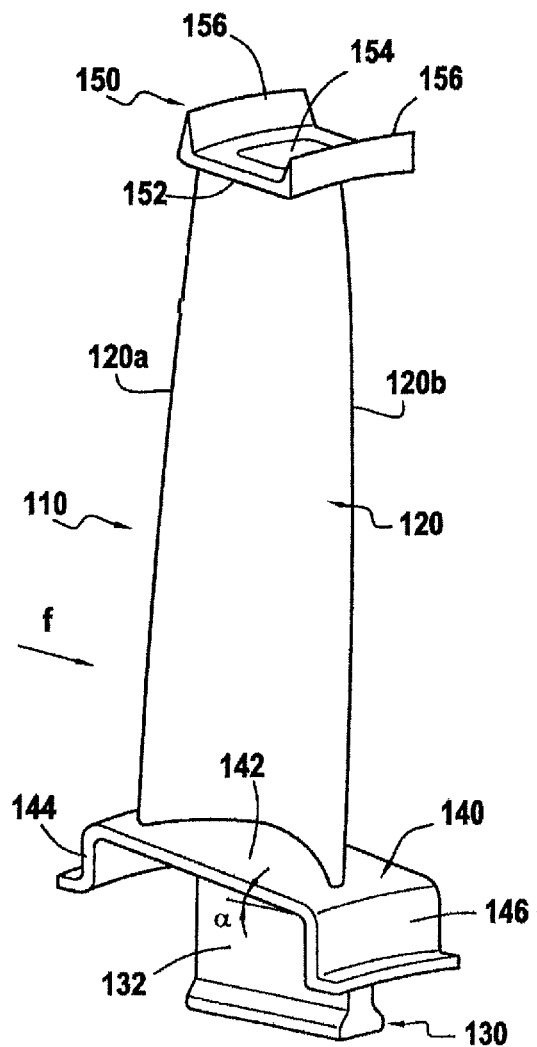
FIG. 3 is a perspective view of a turbomachine blade having inner and outer platforms incorporated therein.

Fabricating Turbomachine Blades Out of CMC Material Having Inner and Outer Platforms Incorporated Therein The method of the invention may be used to fabricate various types of turbomachine blades, for example blades of a rotor disk of a low pressure turbine, which blades have inner and outer platforms incorporated therein, like the blade 110 shown in FIG. 3.

The blade 110 of FIG. 3 comprises in well-known manner an airfoil 120, a root 130 formed by a thicker portion, e.g. presenting a section in the form of a bulb that is extended by a tang 132, an inner platform 140 situated between the root 130 and the airfoil 120, and an outer platform 150 in the vicinity of the free end of the airfoil.

The airfoil 120 extends in a longitudinal direction between the inner platform 140 and the outer platform 150 and presents a cross-section in the form of a curved profile of thickness that varies between its leading edge 120a and its trailing edge 120b.

The blade 110 is mounted on a turbine rotor (not shown) by engaging the root 130 in a housing of complementary shape arranged in the periphery of the rotor. The root 130 is extended by the tang 132 in order to connect with the inner (or bottom) face of the inner platform 140.

At its radially inner end, the airfoil 120 is connected to the platform 140 via an outer (or top) face 142 of the inner platform, which face defines the inside of the flow passage for the gas stream through the turbine. In its end portions that are upstream and downstream (relative to the flow direction f of the gas stream), the lower platform is terminated by rims 144 and 146. In the example shown, the face 142 of the inner platform slopes so as to form overall a non-zero angle $\alpha$ relative to the normal to the longitudinal direction of the blade. Depending on the profile desired for the inside surface of the gas stream flow passage, the angle $\alpha$ may be zero, or the face 142 may have a profile that is generally not rectilinear, for example it may be curved.

At its radially outer end, the airfoil is connected to the outer platform 150 via an inner (bottom) face 152 of the outer platform, which face defines the outside of the gas stream flow passage. On its (top) outer side, the outer platform defines a depression or bath tub 154. Along the upstream and downstream edges of the tub 154, the outer platform carries wipers 156 of tooth-shaped profile having ends that can penetrate into a layer of abradable material of a turbine ring (not shown) in order to reduce the clearance between the tip of the blade and the turbine ring. In the example shown, the face 152 of the outer platform extends substantially perpendicularly to the longitudinal direction of the blade. In a variant, depending on the profile desired for the outer surface of the gas stream flow passage, the face 152 could be inclined so as to form a generally non-zero angle relative to the normal to the longitudinal direction of the blade, or the face 152 could have a profile that is generally not rectilinear, for example that is curved.

FIG. 4 is a highly diagrammatic view of a fiber blank 200 from which a blade fiber preform can be shaped so that after being densified by a matrix and possibly after being machined, a blade is obtained that is made of composite material and that has inner and outer platforms incorporated therein, as shown in FIG. 3. A single blank 200 is shown in FIG. 4, it being observed that a succession of such blanks are woven continuously in a fiber strip, as mentioned above and as described in greater detail below.

The blank 200 comprises two portions 202 and 204 that are obtained by three-dimensional weaving or multilayer weaving, with only the envelopes of these two portions being shown in FIG. 4. After shaping, the portion 202 is to constitute a portion of the blade fiber preform that corresponds to a preform for the airfoil and for the blade root. After shaping, the portion 204 is to constitute the portions of the blade fiber preform that correspond to the preforms of the inner and outer platforms of the blade.

The two portions 202 and 204 are in the form of strips extending generally in a direction that corresponds to the longitudinal direction X of the blade that is to be made. In its portion that is to form a blade preform, the fiber strip 202 presents varying thickness that is determined as a function of the thickness of the profile of the airfoil of the blade that is to be made. In its portion that is to form a root preform, the fiber strip 202 presents extra thickness 203 that is determined as a function of the thickness of the root of the blade that is to be made.

The fiber strip 202 has a width l selected as a function of the developed length of the profile of the airfoil and of the root of the blade that is to be made (i.e. the length of the profile when laid out flat), whereas the fiber strip 204 has a width L that is greater than l and that is selected as a function of the developed lengths of the inner and outer platforms of the blade that is to be made.

The fiber strip 204 is of thickness that is substantially constant and that is determined as a function of the thicknesses of the inner and outer platforms of the blade that is to be made. The strip 204 comprises a first portion 204a that extends along and in the vicinity of a first face 202a of the strip 202, a second portion 204b that extends along and in the vicinity of the second face 202b of the strip 202, and a third portion 205a that extends along and in the vicinity of the first face 202a of the strip 202.

The portions 204a and 204b are connected together by a connection portion 240c that extends transversely relative to the strip 202 at a location corresponding to the location of the inner platform of the blade that is to be made. The connection portion 240c passes through the strip 202 forming an angle $\alpha$ relative to the normal to the longitudinal direction of the fiber blank. The portions 204b and 205a are connected together by a connection portion 250c that extends transversely relative to the strip 202 at a location corresponding to that of the outer platform of the blade that is to be made. In the example shown, the connection portion 250c passes through the strip 202 substantially perpendicularly to the longitudinal direction of the fiber blank. Depending on the shape desired at the outer platform of the blade, the connection portion 250c may pass through the strip 202 at a non-zero angle relative to the normal to the longitudinal direction of the blank, as for the inner platform. In addition, the profile of the connection portion 240c and/or that of the connection portion 250c may be curvilinear instead of being rectilinear as in the example shown.

As described in greater detail below, the strips 202 and 204 are woven simultaneously by three-dimensional weaving, but without bonding between the strip 202 and the portions 204a, 204b, and 205a of the strip 204, and while weaving a plurality of successive blanks 200 continuously in the direction X.

FIGS. 5 to 7 are highly diagrammatic views showing how a fiber preform of a shape close to that of the blade that is to be fabricated can be obtained starting from the fiber blank 200.

The fiber strip 202 is cut at one end in the extra thickness 203 and at another end a little beyond the connection portion 250a so as to have a strip 220 of length that corresponds to the longitudinal dimension of the blade that is to be fabricated with a swollen portion 230 formed by the extra thickness 203 situated at a location that corresponds to the position of the root of the blade that is to be fabricated.

yarns (number of yarns per unit length in the weft direction), with a smaller count enabling greater thinning during shaping of the preform by molding.

Figure 8:
FIG. 8 is a section view showing the profile made flat of a blade such as that shown in FIG. 3.
Figure 9:
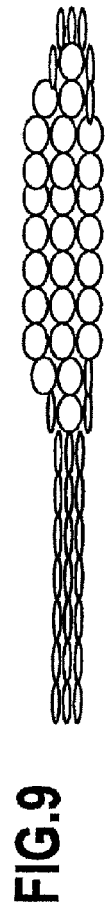
FIG. 9 is a section view of a set of warp yarn layers making it possible to obtain a profile such as that shown in FIG. 8.

Thus, in order to obtain an airfoil profile for the blade as shown projected flat in FIG. 8, it is possible to use three layers of warp yarns of varying weight and count, as shown in FIG. 9.

In an embodiment, the yarns used may be silicon carbide (SiC) yarns sold under the name "Nicalon" by the Japanese supplier Nippon Carbon and having a weight (number of filaments) of 0.5K (500 filaments). The warp is formed using SiC yarns of 0.5K and SiC yarns of 1K obtained by uniting pairs of 0.5K yarns, the two yarns being united by a covering. The covering is advantageously obtained using a yarn of sacrificial nature suitable for being eliminated after weaving, e.g. a yarn of polyvinyl alcohol (PVA) that can be eliminated by being dissolved in water.

Table I below gives, for each column of warp yarns: the count (number of yarns per centimeter in the length of the profile), the number 0.5K yarns, the number of 1K yarns, and the thickness of the profile in millimeters (mm), with this thickness varying over the range 1 mm to 2.5 mm, approximately.

TABLE I

| Column | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Count | 6 | 6 | 6 | 6 | 6 | 6 | 6 | 8 | 8 | 8 | 8 | 8 | 8 | 8 | 8 | 8 | 8 | 8 | 6 |
| No. of 0.5 yarns | 3 | 3 | 3 | 3 | 3 | 3 | 3 | 2 | 1 | 0 | 0 | 0 | 0 | 0 | 0 | 0 | 2 | 1 | 3 |
| No. of 2 × 0.5K yarns | 0 | 0 | 0 | 0 | 0 | 0 | 0 | 1 | 2 | 3 | 3 | 3 | 3 | 3 | 3 | 3 | 1 | 2 | 0 |
| Thickness | 1 | 1 | 1 | 1 | 1 | 1 | 1.2 | 1.5 | 2 | 2.2 | 2.4 | 2.5 | 2.4 | 2.4 | 2.2 | 2.1 | 1.8 | 1.5 | 1.2 |

Furthermore, cuts are formed at the ends of the portions 204a, 205a of the strip 204 and in the portion 204b thereof so as to leave segments 240a and 240b remaining on either side of the connection portion 240c, and segments 250a and 250b on either side of the connection portion 250c, as shown in FIG. 5. The lengths of the segments 240a, 240b, and 250a, 250b are determined as a function of the lengths of the inner and outer platforms of the blade that is to be fabricated.

Due to the absence of bonding between the strip 202 of the fiber blank, on the one hand, and the portions 204a, 204b, and 205a, on the other hand, the segments 240a, 240b, 250a, and 250b can be folded perpendicularly to the strip 202 without cutting yarns in order to form plates 240 and 250, as shown in FIG. 6.

A fiber preform 300 of the blade that is to be fabricated is subsequently obtained by molding, with the strip 202 being deformed so as to reproduce the curved profile of the airfoil of the blade and with the plates 240, 250 being deformed so as to reproduce shapes that are similar to those of the inner and outer platforms of the blade, as shown in FIG. 7. A preform is thus obtained having a portion 320 constituting an airfoil preform, a portion 330 constituting a root preform (including a tang preform), and portions 340 and 350 constituting preforms of the inner and outer platforms.

There follows a description in greater detail of a method of three-dimensionally weaving the fiber blank 200.

It is assumed that the weaving is performed using warp yarns that extend in the longitudinal direction X of the blank, it being observed that weaving using weft yarns that extend in this direction is also possible.

The variation in the thickness of the strip 202 along its width is obtained by using warp yarns of varying weight. In a variant, or in addition, it is possible to vary the count of warp Naturally, depending on the yarn weights available, different combinations of numbers of layers of yarns and variations in count and in weight could be adopted in order to obtain the desired profile.

Figure 10A:
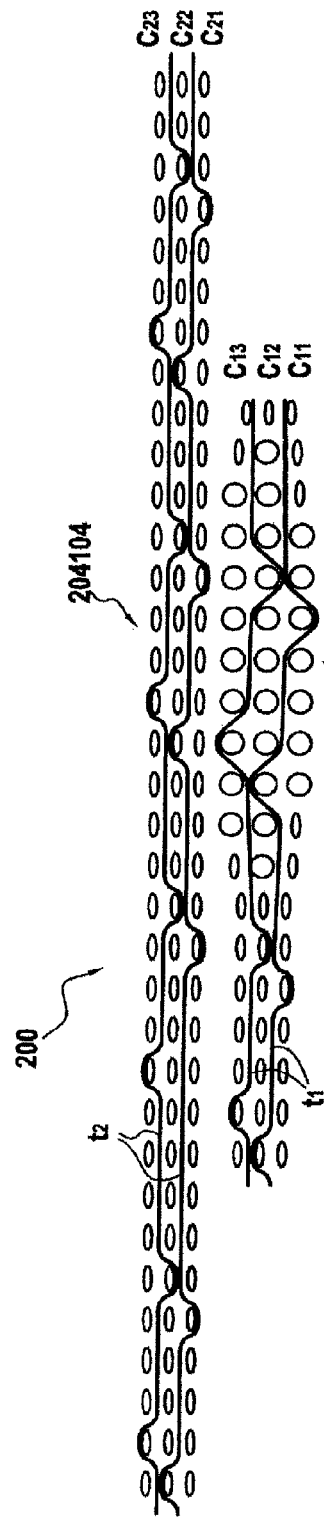
FIGS. 10A and 10B are warp section views showing one way of weaving the fiber blank of FIG. 4.
Figure 10B:
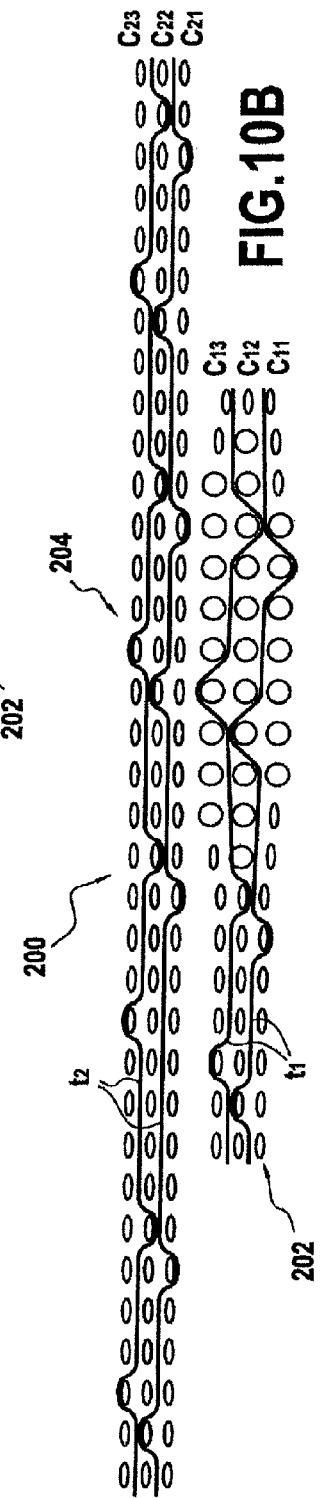

FIGS. 10A and 10B are warp sections in two successive planes of a weave suitable for being used for weaving the fiber blank 200 outside its extra thickness 203.

The strip 202 of the fiber blank 200 comprises a set of warp yarn layers, where the number of layers in this example is equal to three (layers $C_{11}$, $C_{12}$, $C_{13}$). The warp yarns are connected together by weft yarns $t_1$ by three-dimensional weaving.

The strip 204 thus has a set of warp yarn layers, e.g. likewise equal to three (layers $C_{21}$, $C_{22}$, $C_{23}$) interlinked by weft yarns $t_2$ by three-dimensional weaving, like the strip 202.

It should be observed that the weft yarns $t_1$ do not extend in the warp yarn layers of the strip 204 and that the weft yarns $t_2$ do not extend in the warp yarn layers of the strip 202 so as to obtain de-bonding.

In the example shown, the weaving is multilayer weaving using a satin or multi-satin type weave. Other types of three-dimensional weaving could be used, for example multilayer weaving with a multi-plain weave or weaving with an "interlock" type weave. The term "interlock" weaving is used herein to mean a weave in which each layer of weft yarns weaves together a plurality of layers of warp yarns with all of the yarns in a given column of the weft having the same motion in the weave plain. Various methods of three-dimensional weaving are described in particular in document WO 2006/136755, the contents of which is incorporated herein by reference.

Figure 11:
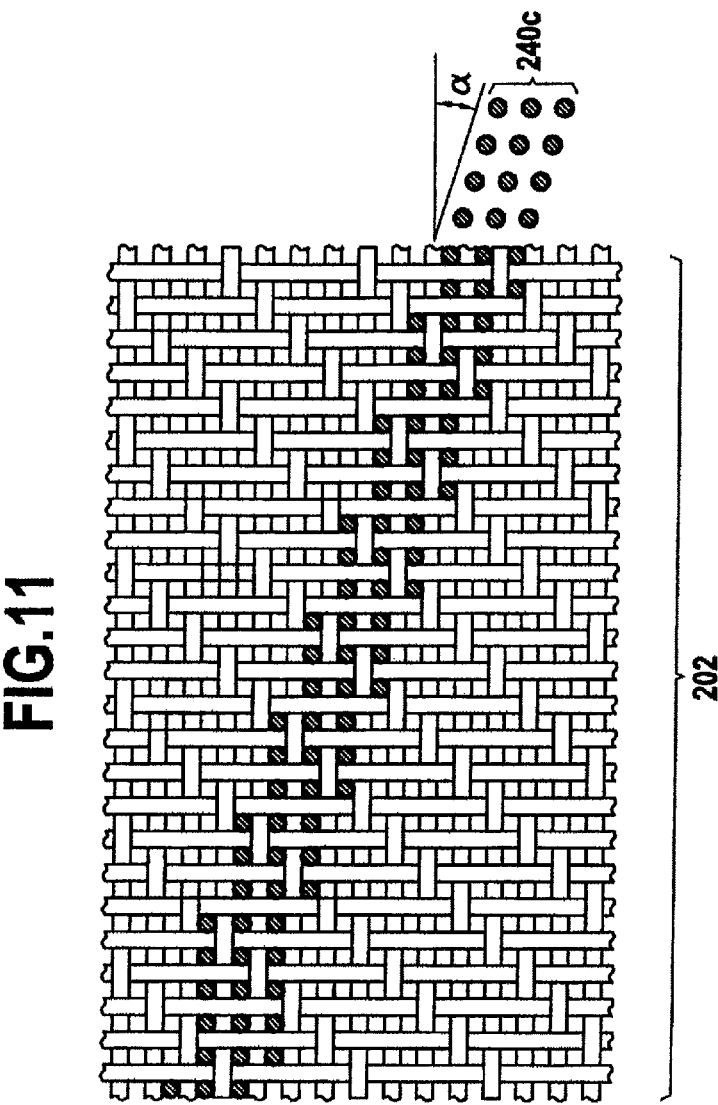
FIG. 11 is a fragmentary section view on a plane parallel to the warp and weft directions in a portion of the FIG. 4 fiber blank corresponding to the location of the junction between the airfoil and the inner platform of the blade.

FIG. 11 is a section view parallel to the warp and weft direction where the strip 202 has the connection portion 240c of the strip 204 passing therethrough, the warp yarns of the connection portion being shown in section. Each layer of warp yarns extends, in this connection portion 240c, in a direction that makes an angle α relative to the weft direction of the strip 202. The passage of the strip 204 from one side to the other of the strip 202 is achieved, during weaving, by making all of the warp yarns and weft yarns of the strip 202 cross each of the warp yarns of the strip 204, individually.

Figure 12:
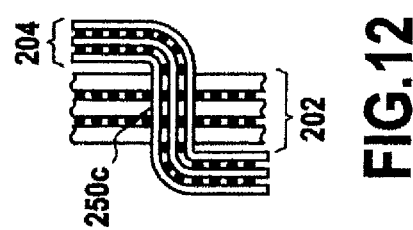
FIG. 12 is a fragmentary view in weft section through a portion of the fiber blank of FIG. 4 that corresponds to the location of the junction between the airfoil and the outer platform of the blade.

FIG. 12 is a weft section view where the strip 202 has the connection portion 250c of the strip 204 passing therethrough. In the example shown, and as mentioned above, the connection portion 250c extends perpendicularly to the warp direction of the strip 202. Nevertheless, as for the connection portion 240c, it is possible to have a connection portion 250c that extends at a non-zero angle relative to the normal to the warp direction, depending on the orientation that is desired for the outer platform.

The extra thickness 203 may be obtained by using weft yarns of greater weight and additional layers of weft yarns, as shown for example in FIG. 13A.

In FIG. 13A, the number of weft yarns goes in this example from four to seven between a fiber blank portion $202_1$ of the strip 202 corresponding to the tang of the blade and a fiber blank portion $202_3$ of the strip 202 that presents the extra thickness 203.

In addition, weft yarns $t_1$, $t'_1$, $t''_1$ of different weights are used, the yarns $t_1$ being for example "Nicalon" SiC yarns weighing 0.5K (500 filaments), the yarns $t'_1$ being obtained by uniting two 0.5K yarns, the yarns $t''_1$ being obtained by using three 0.5K yarns.

In the blank portion $202_3$, weaving requires layers of warp yarns in greater numbers than in the portion $202_1$. This is advantageously achieved during the transition between the portion $202_1$ and the portion $202_3$ by reducing the number of warp planes by making up each warp plane in the portion $202_3$ by bringing together warp yarns of two warp planes in the portion $202_1$. FIGS. 13B and 13C show two warp planes that are adjacent in the portion $202_1$, and FIG. 13D show a warp plane obtained in the portion $202_3$ by uniting the warp planes of FIGS. 13B and 13C. In FIGS. 13B, 13C, and 13D, for reasons of simplicity, the differing weights of the warp yarns or of the weft yarns are not shown (as they are in FIG. 9 and FIG. 13A, respectively). On passing from FIGS. 13B, 13C to FIG. 13D, the dashed lines show how the warp yarns of the various layers of FIGS. 13B and 13C form the layers of warp yarns in FIG. 13D.

Naturally, other combinations of numbers of weft layers and weft layer weights could be adopted in order to form the extra thickness 203.

In another embodiment shown diagrammatically in FIG. 14, the extra thickness 203 may be obtained by introducing an insert while weaving the strip 202.

In FIG. 14, the set $T_1$ of weft yarn layers in the portion $202_1$ of the strip 202 corresponding to the tang of the blade is split by de-bonding during the weaving of two subsets $T_{11}$, $T_{12}$, with an insert $203_1$ being introduced between them. In the example shown, the portion $202_1$ has thickness greater than that of the portion $202_2$ of the strip 202 that corresponds to the airfoil of the blade. The transition between the portion $202_2$ and the portion $202_1$ may be achieved in the same manner as that described above for the transition between the portions $202_1$ and $202_3$ of FIG. 13A. The passing of the strip 204 through the strip 202 at the level of the connection portion 240c of FIG. 4 may optionally take place through the thicker portion $202_1$.

At the end of the insert 203 remote from the portion $202_1$, the subsets $T_{11}$, $T_{12}$ of the layers of weft yarns, are reunited by weaving so as to form a portion $202'_1$ having the same thickness as the portion $202_1$, and then form a portion $202'_2$ having the same thickness as the portion $202_2$ by thickness reduction, the portion $202'_2$ forming the portion that corresponds to a blade airfoil for the following woven blank.

The insert $203_1$ is preferably made of monolithic ceramic, preferably of the same ceramic material as that forming the matrix of the composite material of the blade that is to be fabricated. Thus, the insert $203_1$ may be a block of SiC obtained by sintering SiC powder.

Figure 15:
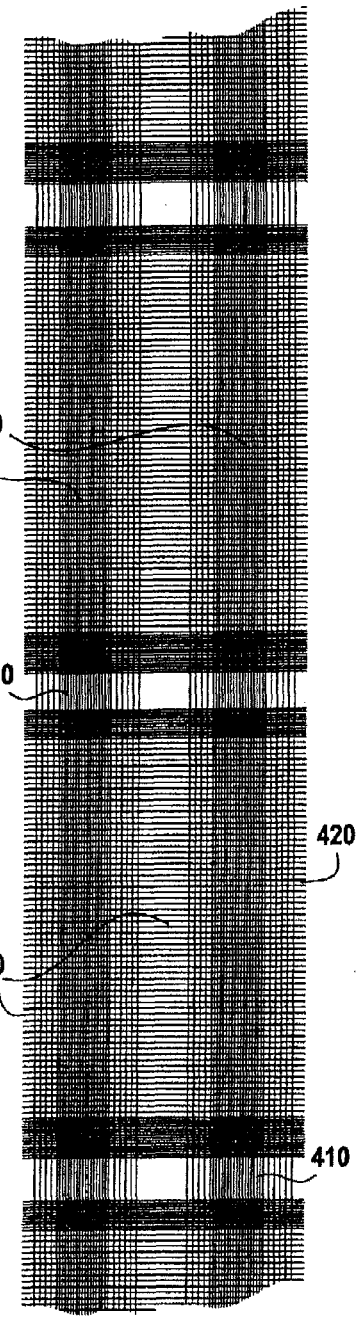

As shown very diagrammatically in FIG. 15, a plurality of fiber blanks 200 are obtained by weaving a strip 400 in which one or more rows of successive fiber blanks are formed. Extra-length zones 410, 420 are provided in the warp direction (warp yarns only) and in the weft direction (weft yarns only) in order to avoid edge phenomena associated with weaving, to leave greater freedom in deformation while shaping the preform, and to provide transition zones between the blanks 200.

Figure 16:
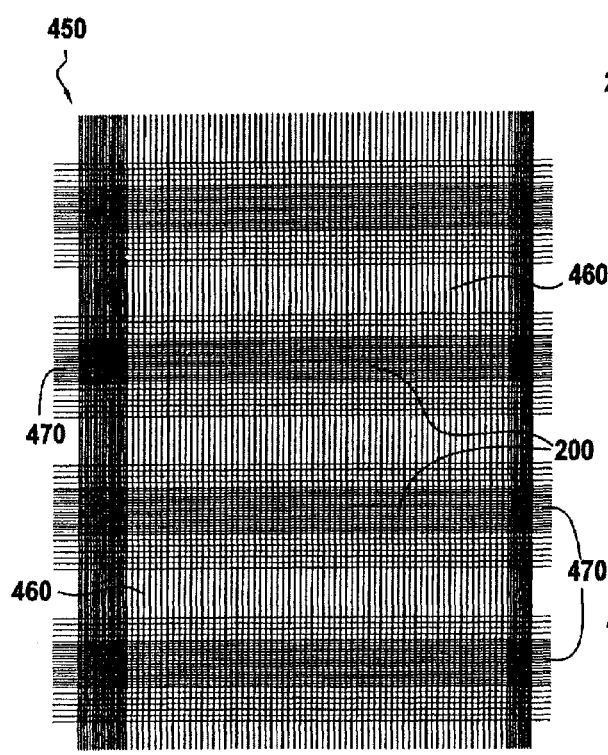
FIGS. 15 and 16 are highly diagrammatic views showing two ways of making a woven fiber strip obtained by three-dimensional weaving and including a plurality of fiber blanks such as that shown in FIG. 4.

FIG. 16 shows a variant embodiment in which a strip 450 is made with a row of blanks 200 woven in the weft direction perpendicularly to the longitudinal direction of the strip. Zones of extra length 460, 470 are also provided in the warp direction and in the weft direction. A plurality of rows of blanks 200 may be woven, the width of the strip 450 being adapted for this purpose.

The steps of applying fiber surface treatment, forming a first layer of interphase coating, impregnating with a consolidation composition, and pre-curing in the method of the FIG. 1 implementation are performed before cutting blanks out from the strip 400 or 450.

After the blanks have been cut out, the steps of shaping each blank in a mold, curing the consolidation resin, pyrolyzing the cured resin, forming an additional layer of interphase coating, and densifying in a plurality of cycles with intermediate machining are performed as described with reference to FIG. 1.

Figure 2:
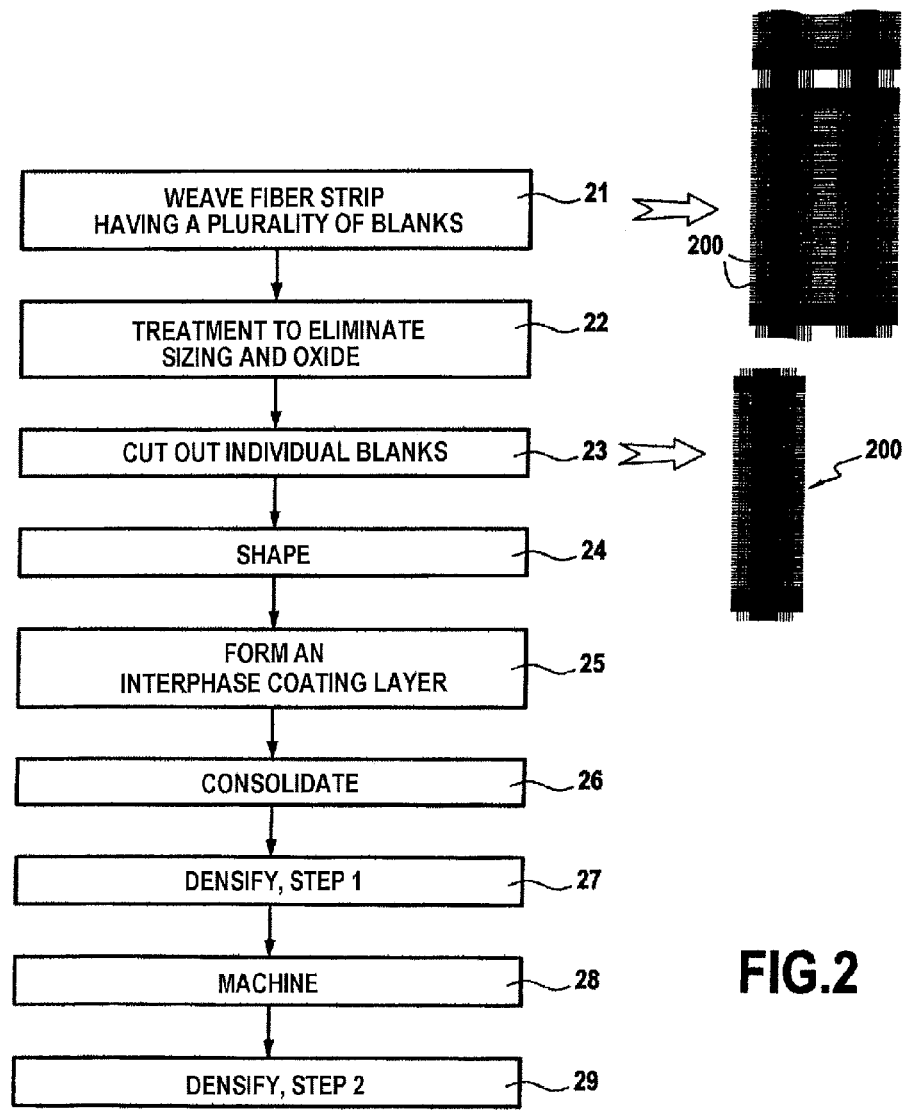
FIG. 2 shows the successive steps of a second implementation of the method of the invention.

In a variant, it is possible to use the implementation of FIG. 2.

A detailed implementation of the method of fabricating turbomachine blades with incorporated inner and/or outer platforms is given above. The method may be used for fabricating blades that do not include inner or outer platforms, with platforms being subsequently fitted thereto, for example. Under such circumstances, making of the fiber preform can be simplified by making only the fiber strip 202.

Example 2

Fabricating Hot Nozzle Flaps for an Aeroengine Gas Turbine with Afterburning

Figure 17:
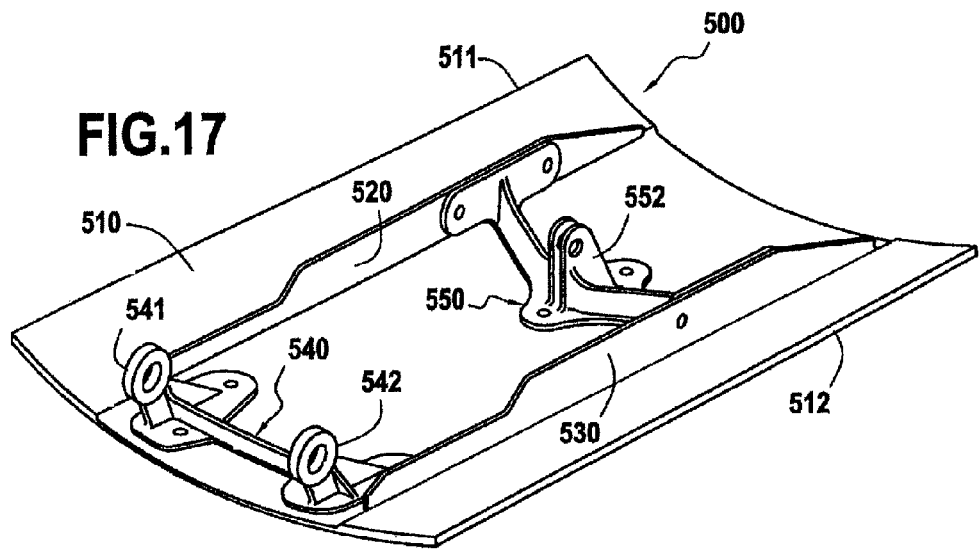
FIG. 17 is a perspective view of a hot steerable flap of a nozzle of a gas turbine aeroengine with post-combustion.

FIG. 17 shows a steerable flap 500 of the kind used for a variable section nozzle in an exhaust channel of a turbine engine having post-combustion.

The flap 500 comprises a flap body 510 generally in the form of a cylindrical sector extending between two longitudinal edges 511, 512. Stiffener ribs 520, 530 are formed on the concave face of the flap 500. At one longitudinal end 501 of the flap, a plate 540 is fastened to the concave face of the flap between the ribs 520 and 530, the plate 540 supporting eyelets 541, 542 for passing a hinge pin (not shown) for the flap 500. Another plate 550 is fastened to the concave face of the flap and to the ribs 520, 530. The plate 550 is situated between the ribs 520, 530 at a distance from the end 501 and it carries a hinged connection part 552 for connecting to an actuator (not shown) controlling the angular position of the flap. The flap body 510 is in the form of a single piece of CMC material together with the ribs 520 and 530, while the plates 540, 550 are made of a refractory metal material, for example.

Figures 18, 19:
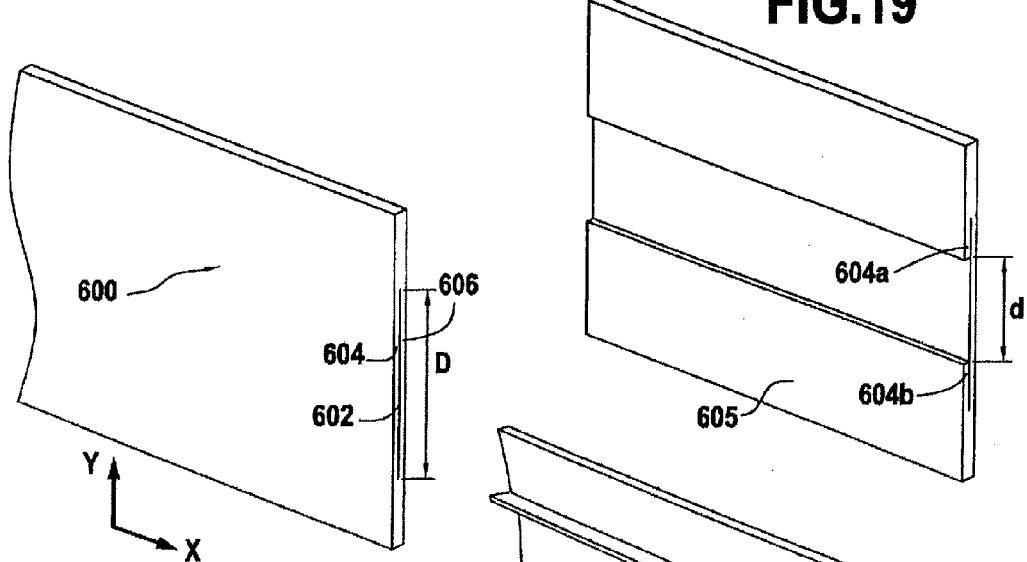
FIG. 18 is a highly diagrammatic view of the arrangement of the layers of yarns in a 3D woven fiber blank for making a fiber preform for a flap body of the kind shown in FIG. 17.
FIGS. 19 and 20 show successive steps in making a fiber preform for a flap body of the kind shown in FIG. 17, from the fiber blank of FIG. 18.

FIG. 18 is a highly diagrammatic view of a fiber blank 600 from which the fiber preform for the body of the flap can be shaped so that after being densified by a matrix and machined a flap body is obtained, like the body 510 shown in FIG. 17.

The blank 600 is in the form of a strip having a longitudinal direction X, the strip being of a width that is selected as a function of the developed width of the flap body 510 that is to be fabricated, i.e. its width after it has been folded out flat. The blank 600 is of substantially constant thickness that is determined as a function of the thickness of the flap that is to be fabricated. A single blank 600 is shown in FIG. 18, it being understood that a succession of such blanks are woven in the form of a continuous fiber strip. The blank 600 is made with a plurality of superposed layers of yarns that are interlinked by 3D weaving. The interlinking between the layers of yarns is performed over the entire thickness of the blank with the exception of a zone 602 that extends longitudinally over a distance D that is selected as a function of the distance in flat projection between the ribs 520, 530 of the flap body 510 that is to be fabricated. The zone 602 of de-bonding lies substantially halfway across the thickness of the blank 600, with the sets of yarn layers 604 and 606 on either side of the de-bonding zone 602 being separate over the entire length of this zone.

Figure 20:
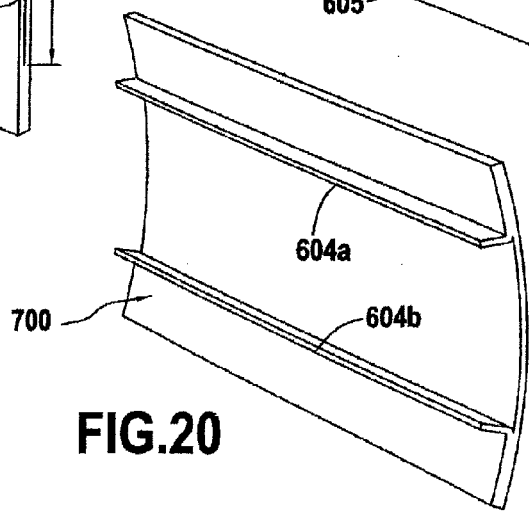

FIGS. 19 and 20 show diagrammatically how a fiber preform of shape close to that of the flap body 510 that is to be fabricated can be obtained from the fiber blank 600.

In the direction X, a dimension is conserved for the blank 600 that is selected as a function of the length of the flap body 510 that is to be fabricated.

Starting from one of the faces 605 of the fiber blank, a portion of the set of yarn layers 604 is removed by being cut away, this portion extending parallel to the direction X over the entire length of the fiber blank. The portion that is removed has a thickness that goes as far as the non-interlinked zone 602. In the direction Y perpendicular to the direction X, the removed portion presents a dimension d that is less than D so as to leave fractions 604a and 604b of the yarn layers set 604 that extends in the direction Y over a length that is selected as a function of the width of the ribs 520, 530 on the flap body 510 that is to be fabricated (FIG. 19).

A fiber preform 700 of the flap body 510 that is to be fabricated is then obtained by molding with deformation in order to reproduce the curved profile of the flap body and to fold back the portions 604a and 604b so as to obtain preform portions for the ribs 520, 530 of the flap body (FIG. 20).

Figure 21B:
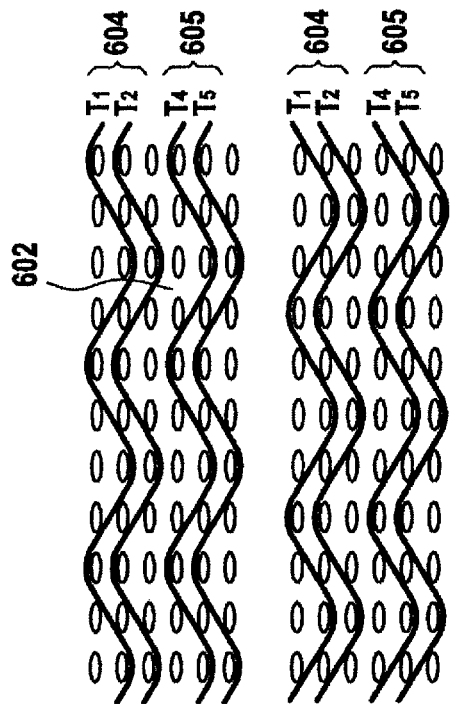
FIGS. 21A and 21B are fragmentary section views on an enlarged scale of a set of layers of yarns forming the blank of FIG. 18.
Figure 21A:
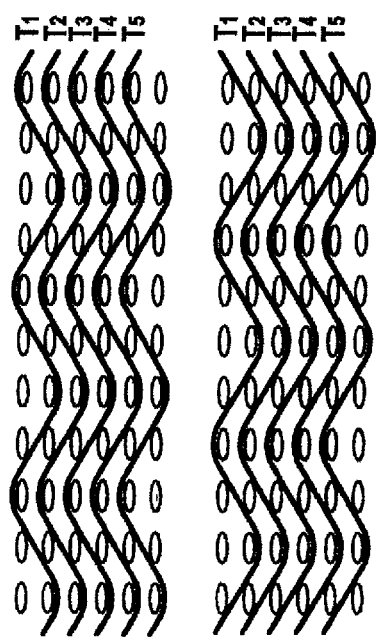

A method of 3D weaving the blank 600 is shown diagrammatically in FIGS. 21A and 21B. FIG. 21A is an enlarged fragmentary view of two successive warp section planes in a portion of the blank 600 showing no de-bonding, while FIG. 21B shows two successive warp section planes in the portion of the blank 600 that includes a de-bonding zone 602.

In this example, the blank 600 has six layers of warp yarns extending in the direction X. In FIG. 21A; the six layers of warp yarns are interlinked by weft yarns $T_1$ to $T_5$, the weave being of the interlock type. In FIG. 21B, three layers of warp yarns forming the yarn layer set 604 are interlinked by two weft yarns $T_1$, $T_2$ and similarly the three layers of warp yarns forming the yarn layer set 605 are interlinked by two weft yarns $T_4$ and $T_5$. The de-bonding zone 602 separates the two sets of warp yarn layers 604 and 605 from each other.

Figure 22:
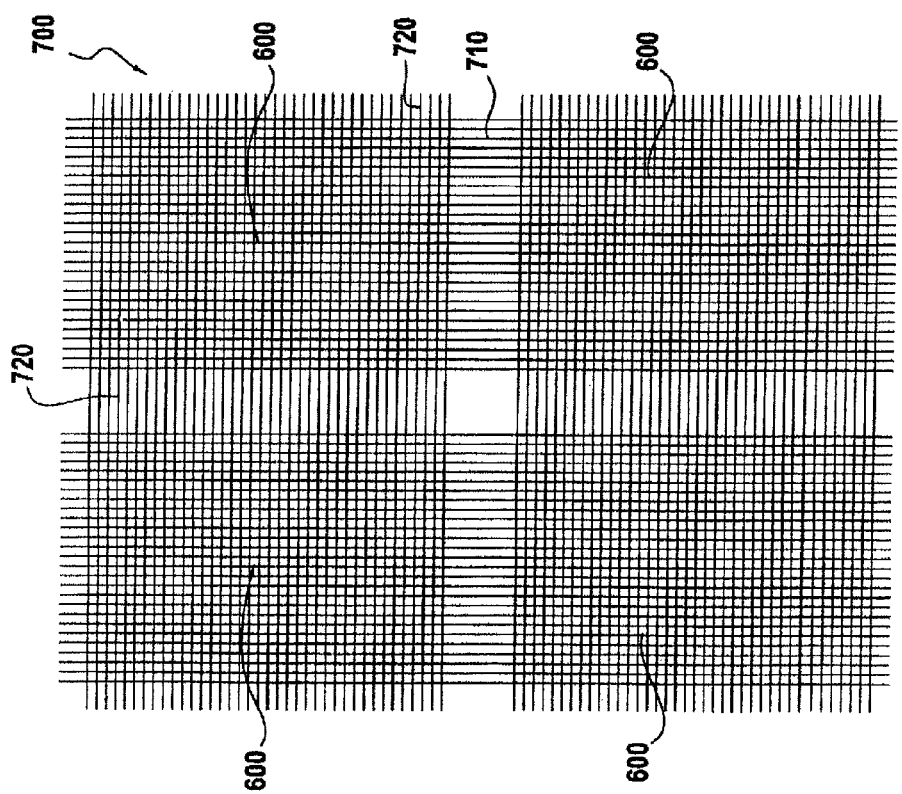

As shown very diagrammatically in FIG. 22, a plurality of fiber blanks 600 are obtained by weaving a strip 700 that has one or more successive rows of blanks formed therein. Extra-length zones 710, 720 are formed in the warp direction (warp yarns only) and in the weft direction (weft yarns only) in order to avoid edge phenomena associated with weaving, leaving greater freedom for deformation when making preforms and providing transition zones between the blanks 600.

Figure 23:
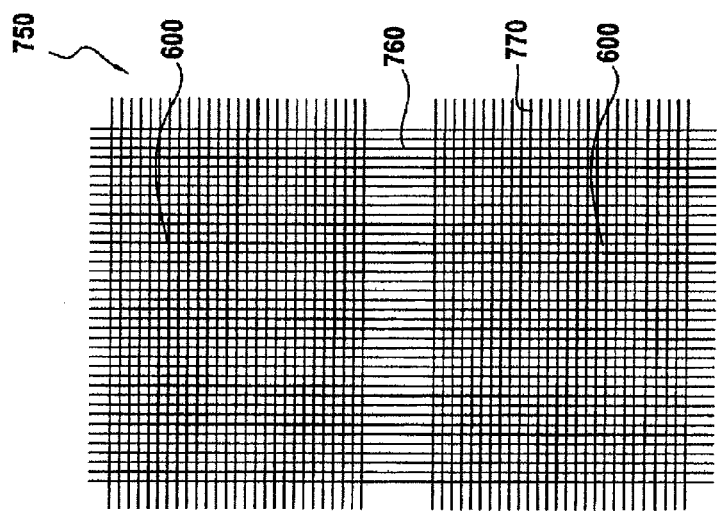
FIGS. 22 and 23 are highly diagrammatic views showing two ways of making a 3D woven fiber strip comprising a plurality of fiber blanks such as that shown in FIG. 18.

FIG. 23 shows a variant embodiment in which a strip 750 is made having a row of blanks 600 woven in the weft direction perpendicularly to the longitudinal direction of the strip. Extra-length zones 760, 770 are likewise provided in the warp direction and the weft direction. A plurality of rows of blanks 600 may be woven, the length of the strip 750 being adapted accordingly.

The steps of applying fiber surface treatment, forming a first layer of interphase coating, impregnating with a consolidation composition, and pre-curing in the method in the implementation of FIG. 1 are performed prior to cutting the blanks 600 out from the strip 700 or 750.

After the blanks have been cut out, the steps of shaping each blank in a mold, curing the consolidation resin, pyrolyzing the cured resin, forming an additional interphase coating layer, and densifying in a plurality of cycles with intermediate machining are performed as described with reference to FIG. 1.

Naturally, in a variant, it is possible to use the implementation of FIG. 2.

The invention claimed is:

1. A method of fabricating a complex part out of composite material comprising three-dimensional woven fiber reinforcement densified by a matrix, the method comprising:
   three-dimensionally weaving a continuous fiber strip comprising a succession of fiber blanks for preforms of a plurality of parts that are to be fabricated;
   subsequently cutting individual fiber blanks out from the strip, each blank being a one-piece blank;
   shaping a cut-out blank to obtain a one-piece fiber preform having a shape that is close to the shape of a part that is to be fabricated; the cut-out blank to be shaped comprising portions that are adjacent to a zone of de-bonding, the zone of de-bonding having been formed during the weaving, the shaping comprising folding or folding back said portions, wherein in the zone of de-bonding, fibers of a first portion do not extend to a second portion and fibers of the second portion do not extend to the first portion;
   consolidating the preform in the desired shape; and
   densifying the consolidated preform by forming a matrix by chemical vapor infiltration.

2. A method according to claim 1, wherein prior to cutting out the individual fiber blanks, the woven fiber strip is impregnated by a consolidation liquid composition comprising a resin, and consolidation is performed by curing and pyrolyzing the resin.

3. A method according to claim 2, wherein prior to impregnating with the consolidation composition, a fiber-matrix interphase layer is formed on the fibers of the woven fiber strip, the interphase layer being made of a material selected from pyrolytic carbon (PyC), boron nitride (BN), and boron-doped carbon (BC).

4. A method according to claim 3, wherein the interphase layer has a thickness of no more than 100 nm.

5. A method according to claim 3, wherein after obtaining the consolidated preform and prior to densifying it with the matrix, an additional fiber-matrix interphase layer is formed.

6. A method according to claim 5, wherein the additional interphase layer is made by chemical vapor infiltration, and wherein the forming of the additional interphase layer and the densification are performed one after the other in an oven.

7. A method according to claim 1, wherein the fiber strip is impregnated with a consolidation composition before cutting out the blanks, said consolidation composition comprising a consolidation resin, and wherein after impregnation with the consolidation composition and before cutting out the blanks, the consolidation resin is subjected to pre-curing.

8. A method according to claim 1, wherein the consolidation comprises curing and pyrolysis of a consolidation resin, and wherein the fiber blank is shaped in a mold in which curing and pyrolysis of the consolidation resin are performed one after the other.

9. A method according to claim 1, wherein a resin is pyrolyzed during a temperature rise that is performed in preparation for an operation of chemical vapor infiltration.

10. A method according to claim 1, wherein the consolidation is performed by partial densification of the preform by chemical vapor infiltration while the preform is held in the desired shape.

11. A method according to claim 10, wherein after shaping and before curing a fiber-matrix interphase coating is formed on the fibers of the preform, the interphase coating being made of a material selected from pyrolytic carbon (PyC), boron nitride (BN), and boron-doped carbon (BC).

12. A method according to claim 1, wherein the densification comprises two steps separated by an operation of machining the partially densified preform.

13. A method according to claim 1, wherein the woven strip comprises a plurality of rows of fiber blank that extend in the longitudinal direction of the strip.

14. A method according to claim 1, wherein the strip is woven with zones of extra length in the warp and weft directions all around the fiber blanks.

15. A method according to claim 1, for fabricating a turbomachine blade, wherein the continuous strip is woven with a succession of fiber blanks that are suitable, after being shaped, for constituting fiber preforms, each constituting a one-piece preform for at least an airfoil and a root of a blade, the fiber blanks being woven with their longitudinal direction, which corresponds to the longitudinal direction of the blades that are to be fabricated, extending in the weft direction or in the warp direction.

16. A method according to claim 1, wherein surface treatment is performed on the fibers of the woven fiber strip, which treatment comprises at least one of the following operations: removing sizing from the fibers and acid treatment of the fibers.

17. A method according to claim 1, wherein the fibers of the first portion and the fibers of the second portion are not interlocked.

18. A method of fabricating a complex part out of composite material comprising three-dimensional woven fiber reinforcement densified by a matrix, the method comprising:

three-dimensionally weaving a continuous fiber strip comprising a succession of fiber blanks for preforms of a plurality of parts that are to be fabricated;

subsequently cutting individual fiber blanks out from the strip, each blank being a one-piece blank;

after cutting, shaping a cut-out blank to obtain a one-piece fiber preform having a shape that is close to the shape of a part that is to be fabricated; the cut-out blank to be shaped comprising portions that are adjacent to a zone of de-bonding, the zone of de-bonding having been formed during the weaving, the shaping comprising folding or folding back said portions wherein in the zone of de-bonding, fibers of a first portion do not extend to a second portion and fibers of the second portion do not extend to the first portion; the shaping comprising deforming the cut-out blank so as to increase a curvature of the cut-out blank where the cut-out blank is observed in cross-section relative to a longitudinal direction of the cut-out blank;

consolidating the preform in the desired shape; and densifying the consolidated preform by forming a matrix by chemical vapor infiltration.

19. A method of fabricating a complex part out of composite material comprising three-dimensional woven fiber reinforcement densified by a matrix, the method comprising:

three-dimensionally weaving a continuous fiber strip comprising a succession of fiber blanks for preforms of a plurality of parts that are to be fabricated; the strip comprising:

a plurality of rows of successive fiber blanks, each of said rows comprising a plurality of fiber blanks, or a row of fiber blanks woven perpendicularly to a longitudinal direction of the strip, subsequently cutting individual fiber blanks out from the strip, each blank being a one-piece blank;

shaping a cut-out blank to obtain a one-piece fiber preform having a shape that is close to the shape of a part that is to be fabricated; the cut-out blank to be shaped comprising portions that are adjacent to a zone of de-bonding, the zone of de-bonding having been formed during the weaving, the shaping comprising folding or folding back said portions wherein in the zone of de-bonding, fibers of a first portion do not extend to a second portion and fibers of the second portion do not extend to the first portion consolidating the preform in the desired shape; and densifying the consolidated preform by forming a matrix by chemical vapor infiltration.

* * * * *